United States Patent [19]

Padawer et al.

[11] Patent Number: 5,220,675
[45] Date of Patent: Jun. 15, 1993

[54] METHOD AND SYSTEM FOR CUSTOMIZING A USER INTERFACE IN AN INTEGRATED ENVIRONMENT

[75] Inventors: Andrew D. Padawer, Redmond; Matthew A. Grove, Seattle, both of Wash.

[73] Assignee: Microsoft Corporation, Redmond, Wash.

[21] Appl. No.: 840,656

[22] Filed: Feb. 20, 1992

Related U.S. Application Data

[63] Continuation of Ser. No. 462,501, Jan. 8, 1990, abandoned.

[51] Int. Cl.⁵ .............................................. G06F 3/00
[52] U.S. Cl. ................................. 395/800; 395/500; 395/155; 395/156; 364/DIG. 1; 364/274.1; 364/286.2; 364/237.2
[58] Field of Search ............... 395/500, 600, 100, 800, 395/156, 157, 155, 159, 160; 364/146

[56] References Cited

U.S. PATENT DOCUMENTS

| | | | |
|---|---|---|---|
| 4,692,858 | 9/1987 | Redford et al. | 364/200 |
| 4,845,665 | 7/1989 | Heath et al. | 364/900 |
| 4,896,291 | 1/1990 | Gest et al. | 364/900 |
| 4,914,568 | 4/1990 | Kodosky et al. | 364/200 |
| 4,914,590 | 4/1990 | Loatman et al. | 364/200 |
| 4,953,080 | 8/1990 | Dysart et al. | 364/200 |
| 4,953,159 | 8/1990 | Hayden et al. | 370/62 |
| 5,119,475 | 6/1992 | Smith et al. | 395/160 |
| 5,121,477 | 6/1992 | Koopmans et al. | 395/156 |

OTHER PUBLICATIONS

Carole Boggs Matthews et al., Using WordStar Professional Series 5 Edition MicroPro.Osborn/McGraw Hill, 1989.

Patricia B. Seybold, Integrated Desk-top Environments, McGraw-Hill Book Company, 1985.

Software Carousel Operating Instructions, Software Logic Solutions, 1986–1987, pp. 14–17 and 36–73.

*Primary Examiner*—Robert B. Harrell
*Assistant Examiner*—Mehmet Geckil
*Attorney, Agent, or Firm*—Seed and Berry

[57] ABSTRACT

A method for allowing a user of a computer program to customize a menu while the computer program is executing is provided. In a preferred embodiment, the computer program provides a customized menu facility. This facility allows a user to add a menu item to a menu and associate that menu item with an external computer program. The computer program in response to selection of the menu item by a user invokes the external computer program. Upon completion of the execution of the external computer program, execution of the computer program is resumed.

4 Claims, 15 Drawing Sheets

METHOD AND SYSTEM FOR CUSTOMIZING A USER INTERFACE IN AN INTEGRATED ENVIRONMENT

CROSS-REFERENCE TO RELATED APPLICATION

This application is a continuation of U.S. application Ser. No. 07/462,501, filed Jan. 8, 1990, now abandoned.

FIELD OF THE INVENTION

This invention relates to the field of computer programming and more specifically to a method and system for customizing a user interface in a programming environment wherein a user interface having menus may be modified to invoke various programs and functions based on the needs of individual users.

BACKGROUND OF THE INVENTION

Computer programming languages have historically provided great flexibility in implementing desired computer functions at the expense of ease of use. For example, in the past, programmers were required to possess intimate knowledge of specific computer language command syntax and language architecture. Recently, much effort has been directed toward improving the ease of programming with a variety of techniques including the use of windows and pull-down, pop-up and tear-off menus. While the use of menu items significantly reduces the litany of computer system details programmers must maintain, the flexibility of a programming environment is often simultaneously reduced. Typically, a computer user interface is configured by its creators and is not readily modified by users. Usually, a user interface is configured to provide functions required by most users. However, for most applications, many desirable functions are not available through menus. No technique is known which allows the ease of using a plurality of menus in a programming environment while also providing the ability for users to customize available menus for individual requirements.

Furthermore, programming languages are usually limited to a set of features and commands which define a programming environment. No technique is known which allows the features of virtually any utility program or programming language to be combined in a single programming environment. For example, in the context of application programs, many word processing programs provide more sophisticated text editing capabilities than are available in a programming environment. In the past, if a programmer required the text editing capabilities of a word processing program, the user was required to quit the programming environment, load the word processing program, perform the desired text editing, quit the word processing program and reload the programming environment. No technique is known which allows a user to invoke, through a menu structure, an arbitrary command or program while automatically passing predefined arguments and returning directly to the programming environment once the desired task is completed.

SUMMARY OF THE INVENTION

Briefly described, the present invention contemplates a method system which allows a user to a computer user interface in a programming environment. The present invention also provides a method and system for invoking utility and application programs and other programming environments from within the programming environment of the present invention, and returning to the programming environment once a desired task is completed. In practice, a plurality of menus are provided for displaying available system commands. Array means are provided for storing data structures and for identifying the location of external executable commands or programs and for storing attributes for executing said external commands. Means are also provided for identifying text of said menus for identifying said external commands or programs and for linking the menu text to the data structures. Means are also provided for automatically executing the external executable command or program when the identified commands are selected on the menus.

Accordingly, it is an object of the present invention to provide a method and system for providing a user customizable user interface in a programming environment.

It is another object of the present invention to provide a method and system for activating programs and utilities from a programming environment and returning to the environment after the programs or utilities have completed execution.

It is yet another object of the present invention to provide a method and system for communicating arguments and other information between a programming environment and any of a number of external utilities or application programs.

BRIEF DESCRIPTION OF THE DRAWINGS

These and other objects may be completely understood through the detailed description of the invention below and the accompanying drawings in which.

DETAILED DESCRIPTION OF THE INVENTION

The present invention provides a high degree of flexibility in creating a custom user-defined user interface as well a providing a method and system for combining features of a wide variety of utility and application programs, programming languages and software modules in a single programming environment. While the preferred embodiment of the present invention is adapted for use with the "QuickC 2.0" (QC2) programming language available from Microsoft, those skilled in the art will appreciate that the principles disclosed herein may be adapted for use in essentially any environment. Further, while the Microsoft QC2 programming language is primarily adapted for use with the Microsoft MS-DOS operating system, the principles of the present invention may be adapted for use with virtually any computer operating system.

Figure 1:
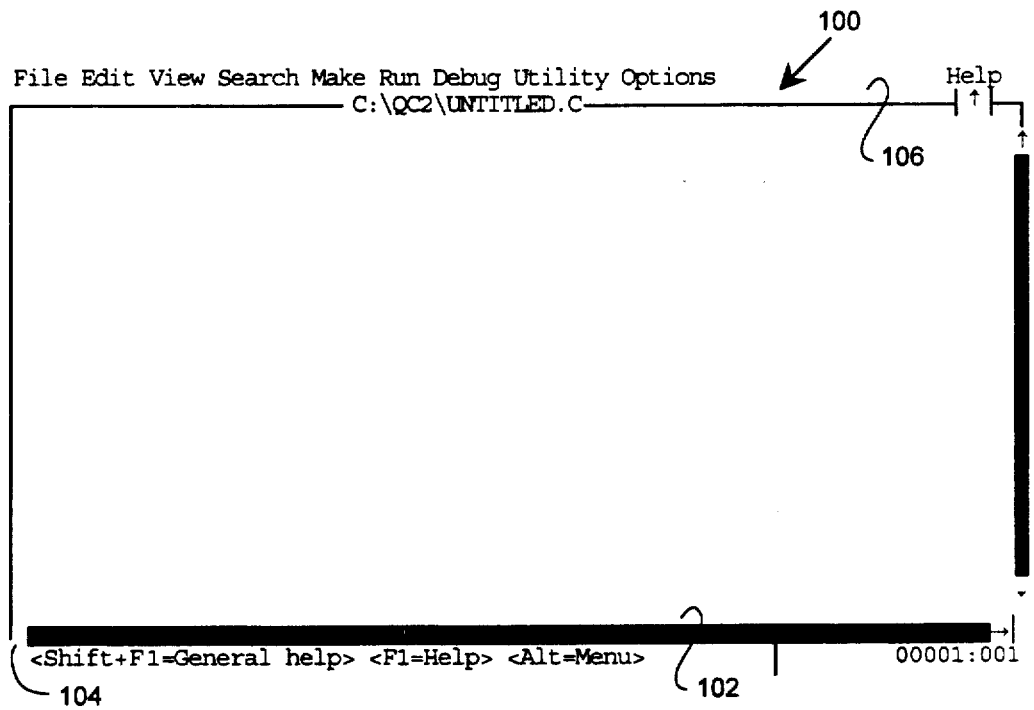
FIGS. 1-9 are a series of diagrams of computers screens displaying the user customizable interface of the present invention.

The present invention is particularly adapted for use with a graphical user interface (GUI) which incorporates a plurality of pull-down, pop-up, or tear-off menus as well as windows and dialog boxes. FIG. 1 is a diagram of the opening screen displayed to a user when operating in the QC2 programming environment. The QC2 user interface 100 includes a display area 102, a status area 104, and a menu bar area 106. The menu bar area 106 is used to invoke various computer commands which are preferably organized in logical categories. For example, menu commands under the file menu would typically include commands for file operations such as opening and closing files, etc.; menu commands under the edit menu would typically contain edit commands such as cut, copy, etc; menu commands under the view menu would typically contain view commands to select desired windows, and so on.

Figure 2:
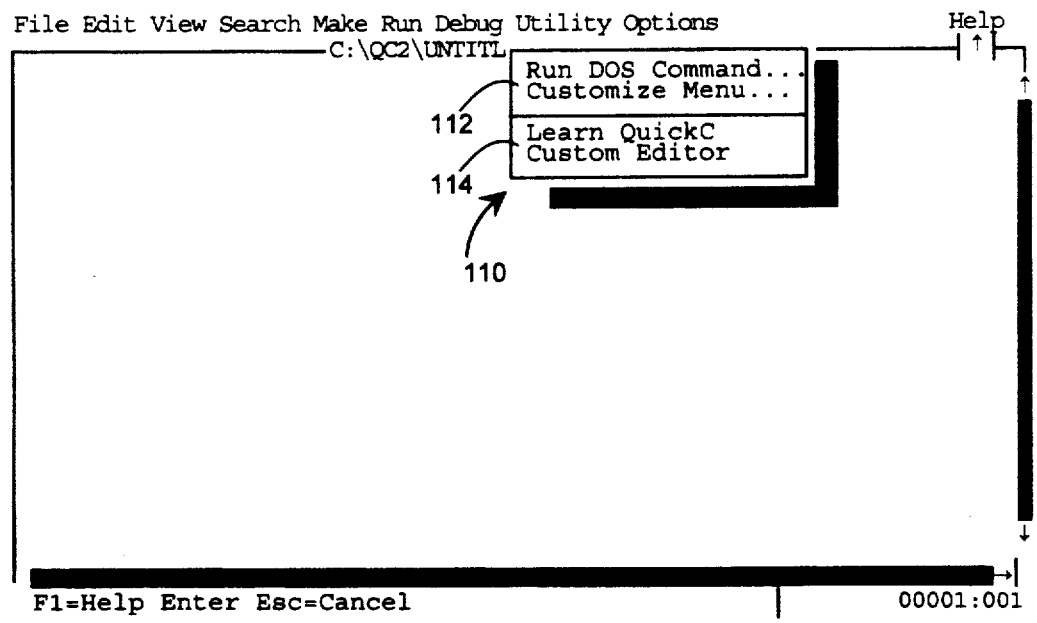

The present invention provides a unique addition to the menu bar under the utility menu. Referring now to FIG. 2, When the utility menu bar item is selected, a menu 110 is displayed wherein the menu 110 is divided into menu portions 112, 114. Menu portion 112 displays fixed menu commands which in the preferred practice of the present invention are the commands "Run DOS Command . . . " and "Customize Menu . . . ". Menu portion 114 displays user defined menu items which may correspond to any of a variety of commands. For example, as shown in FIG. 2, user defined menu commands may include commands to invoke application programs such as the "Learn QuickC" teaching tutorial and the "Custom Editor" editing utility. In addition, users may install menu commands to execute virtually any function which may be performed by a computer.

Figure 3:
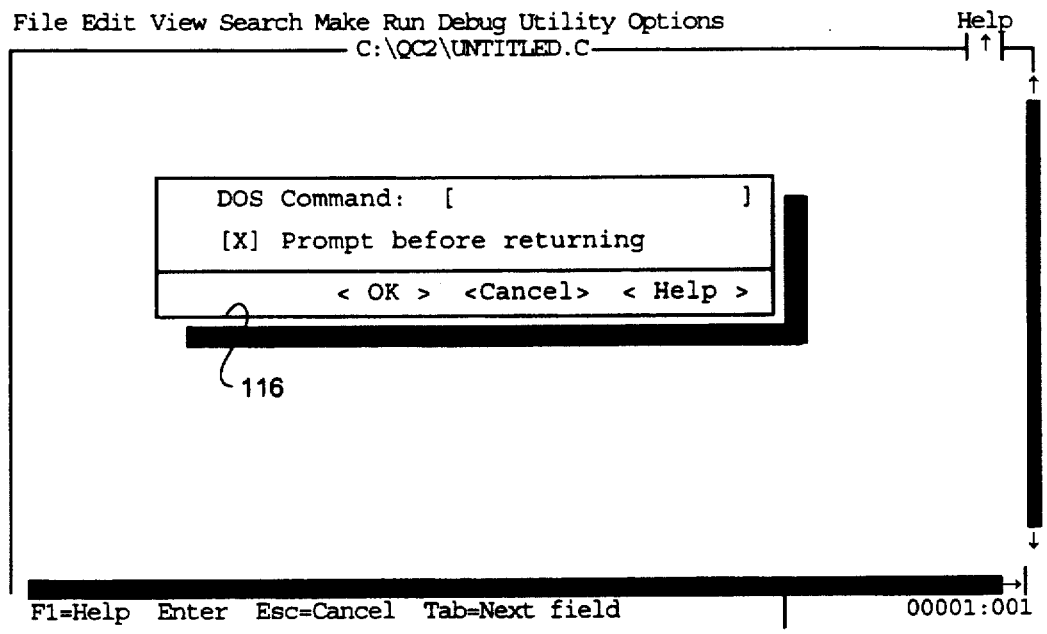
Figure 4:
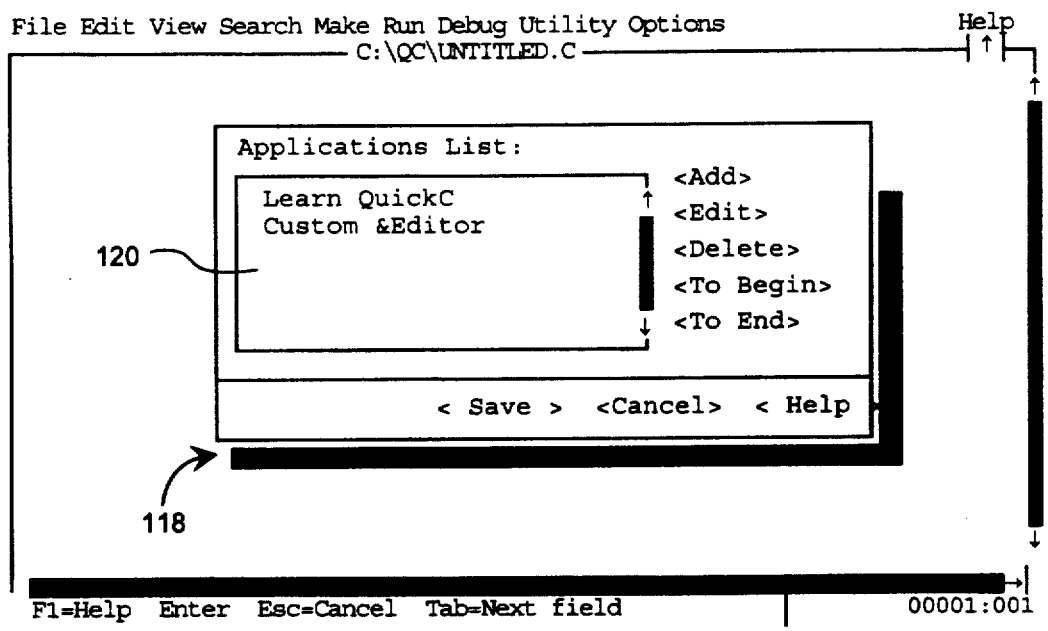
Figure 5:
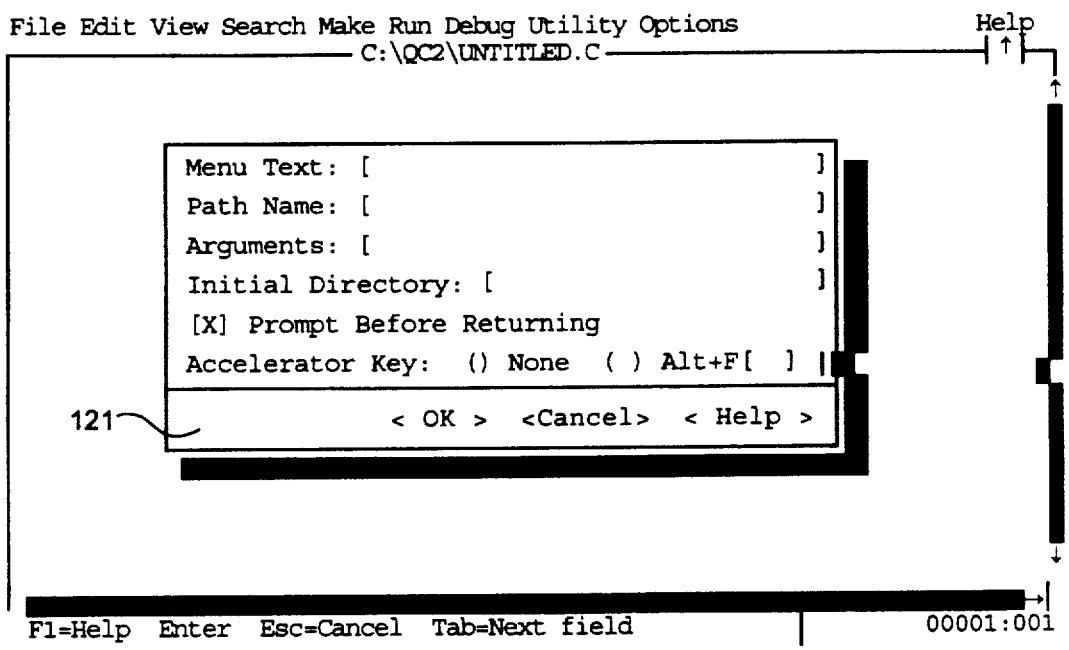

If the user selects the "Run DOS Command . . . " menu command, the dialog box 116 of FIG. 3 is displayed. In this mode, a user simply enters the desired DOS command in the designated area and selects a desired option: "OK", "Cancel", or "Help", by entering a selected keyboard sequence or through the use of a pointing device such as a mouse. If the "OK" option is selected, the present invention executes the entered DOS command and returns to the programming environment. If the user selects the "Customize menu . . . " menu command, the window of FIG. 4 is displayed. When displayed, the dialog box 118 contains an area which displays the menu items which have been added to the user defined menu area 114. At this point, a user has the option of adding a menu item, editing a menu item, deleting a menu item, or re-arranging menu items by moving them to either the beginning or end of the user-defined menu area. In addition, at this point, a user may save changes to the user defined menu area 114, cancel, or invoke a help routine. Once a user selects an option any of a number of dialog boxes may be displayed. For example, FIG. 5 shows a dialog box 121 which is displayed if the "Add" option is selected. The dialog box 121 contains a plurality of fields wherein the "Menu Text" field is used to enter the text to be displayed in the user defined menu area 114; the "Path Name" field is used to enter the path name for invoking the desired function; the "Arguments" field is used to enter any arguments to be passed to the invoked program; and the "Initial Directory" field is used to identify the directory where the desired function is to be executed. In addition to the above fields, the dialog box 121 contains a field for assigning an accelerator key for invoking the designated function. As noted above, virtually any function which may be invoked with a path name may be added to the user defined menu area 114. Once the appropriate information has been entered in the designated fields, the user selects an option: "OK", "Cancel" or "Help."

Figure 6:
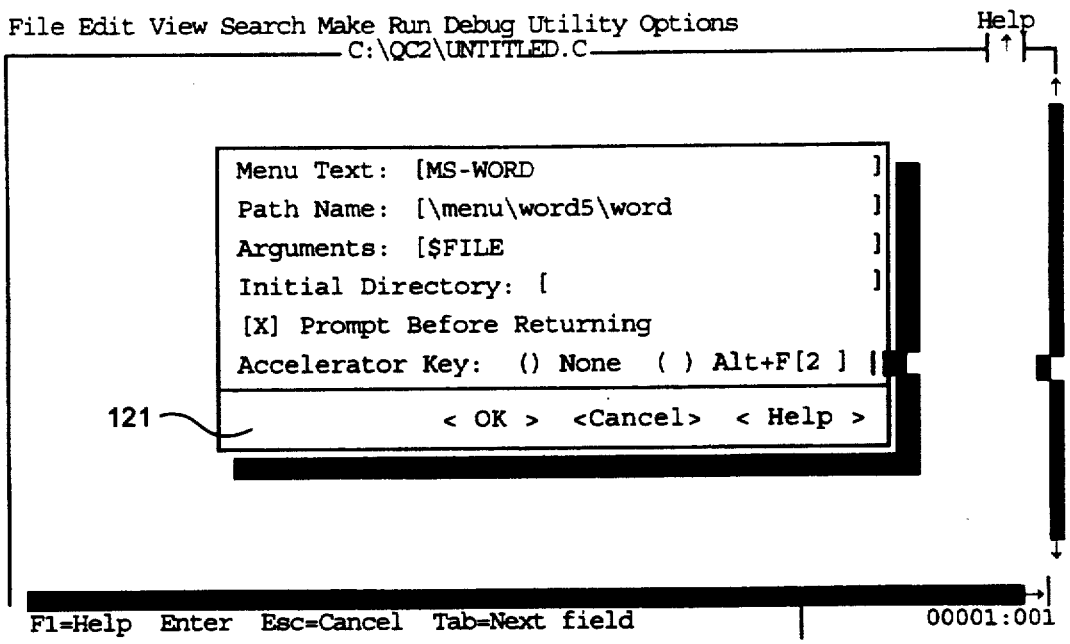
Figure 7:
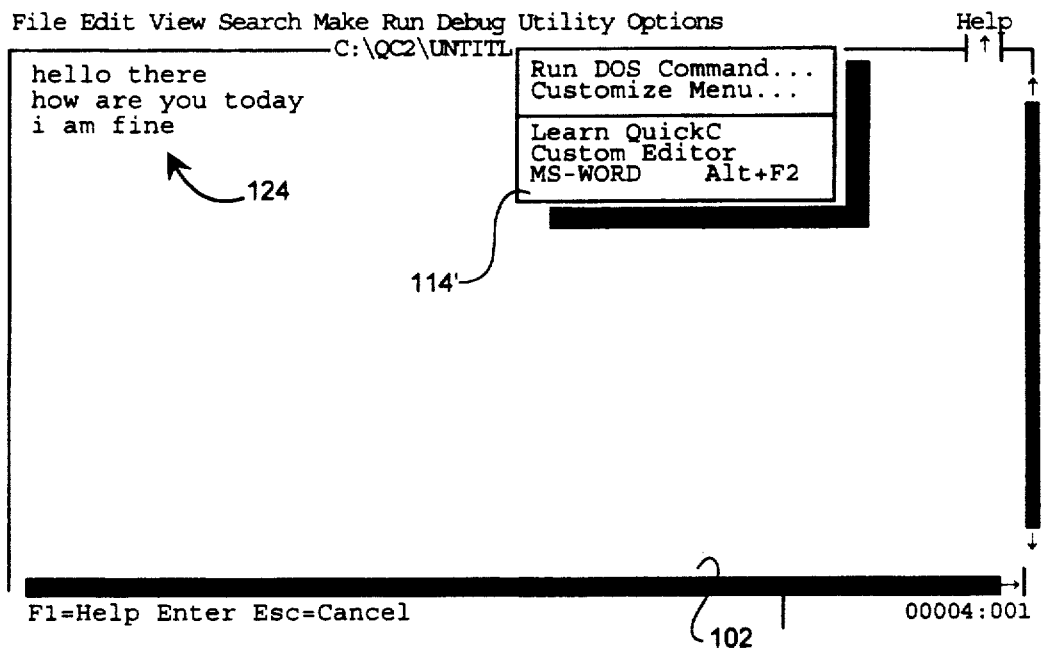

FIG. 6 is a diagram of the dialog box 121 wherein appropriate information has been entered in the respective fields to invoke the Microsoft Word word processing program wherein MS-WORD will be displayed in the user defined menu area 114 and an accelerator key Alt + F2 is assigned for invoking the program. In this example, the program is located in subdirectory word5 which is located in the menu directory although it could be located virtually anywhere in the system. If at this point the user selects "OK", and selects the save option in dialog box 118, the user defined menu area 114 is updated to show the new menu entry as shown in window 114' of FIG. 7. FIG. 7 also shows a block of text 124 which is generated by invoking the Microsoft Word word processing program, entering the text and returning to the programming environment.

Figure 8:
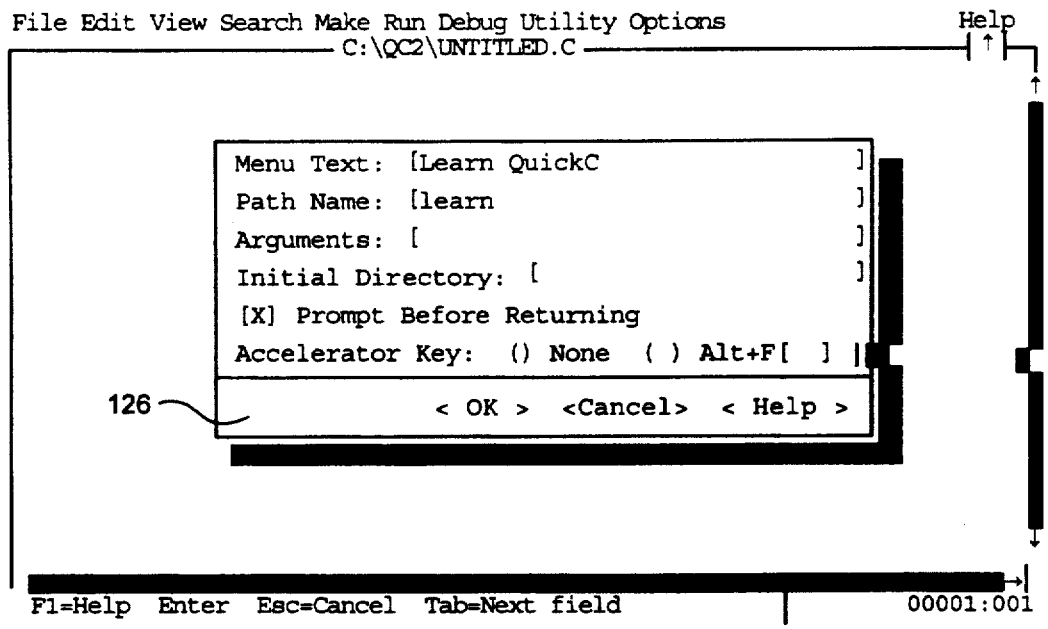

FIG. 8 is a diagram of a dialog box 126 which is displayed if the "Edit" option is selected in the dialog box 118. As above, the edit dialog box contains various fields which are filled by the user to designate which function is to be edited. The "Edit" function allows a user to edit the fields for a custom menu entry which was previously created by means of the "Add" function.

Figure 9:
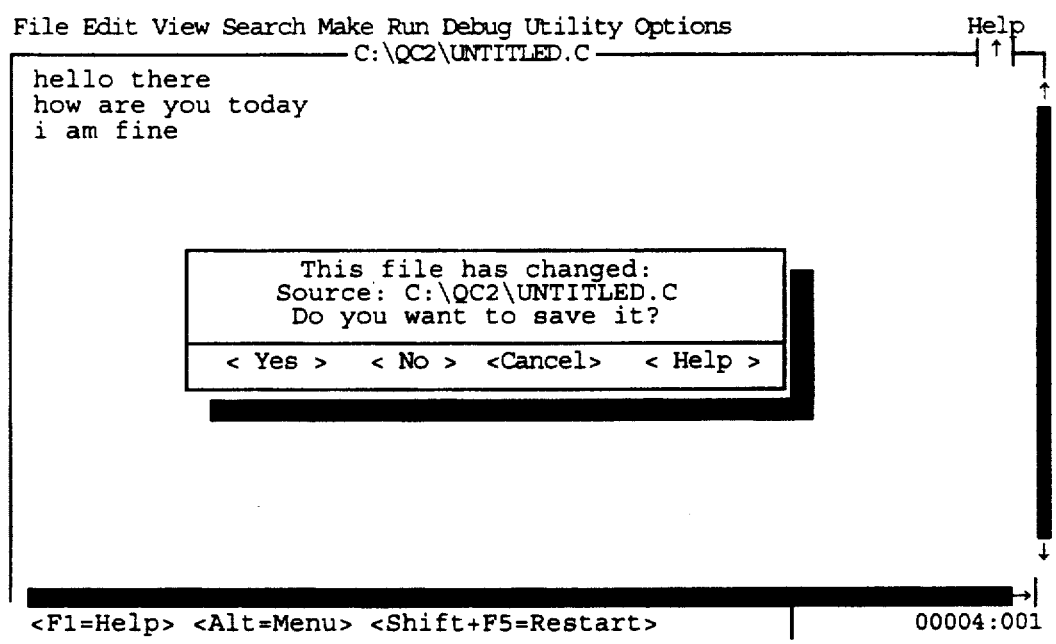

FIG. 9 is the dialog box displayed once a source file is going to be referenced by an external program and it must be saved to disk before running the external program. Once the external program is run, the file is reloaded from disk to reflect any changes which may have been made by the external program.

While the above example was explained in the context of a word processing application program, the principles of the present invention may be applied to any type of computer function and there is no limit to the type of items which may be added to the user defined menu area 114.

Figures 10A, 15B:
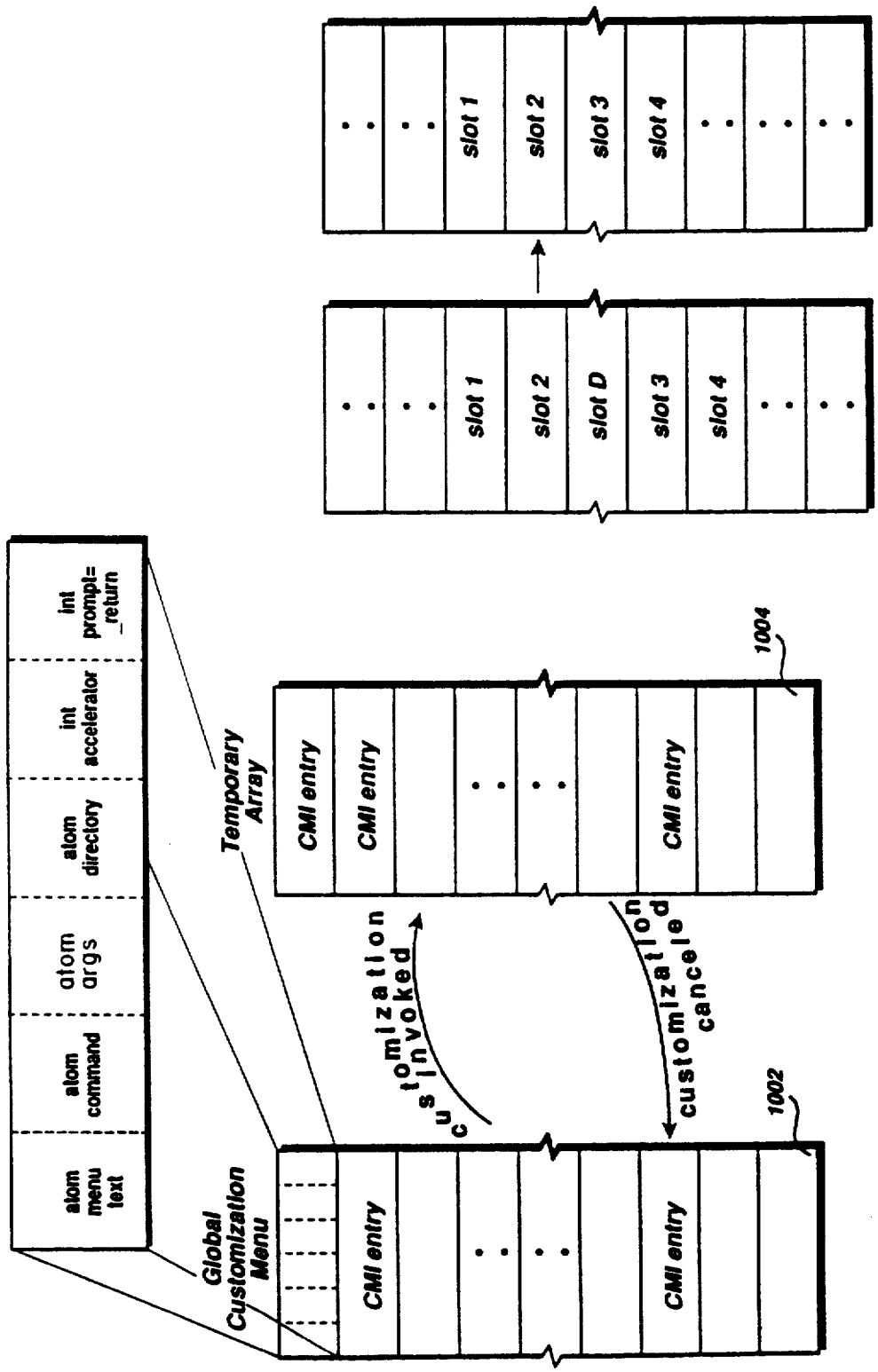
FIG. 10A is a diagram of the data structure and array structure utilized to implement the customization feature of the present invention.
FIG. 15B is a diagram detailing the delete operation on the Custom Menu item array.

Referring now to FIG. 10A, the present invention contemplates the use of custom menu item (CMI) arrays 1002, 1004 for manipulating the menu items in the user defined menu area 114. Specifically, array 1002 is used to store an array of command menu items CMIs wherein each CMI array entry corresponds to a particular menu item. Each CMI entry contains a data structure consisting of fields describing the menu item text, the command to be executed, the arguments to the command, the initial starting directory for the command, the accelerator for the menu item (if any) and a flag indicating whether the user should be prompted prior to returning to the environment. The first four fields are stored as "atoms" which are handles to an atom table. This atom table is used to store and retrieve the desired strings. The contents of each data structure are as follows:

custom menu item (CMI) structure:
atom for menu text
atom for program path
atom for program args
atom for starting directory
int for accelerator (0 implies none)
int for prompt before returning (0:no 1:yes)

The present invention contemplates the use of a variety of atom management routines described in detail below wherein the atom manager maintains a pool of unique strings, each of which is represented by an atom. The atom management routines map back and forth between "strings" and "handles" ("atoms"). The atom management routines used are as follows:

len = GetAtomName(atom, buf, cnt)
atom = AddAtom(buf)
DeleteAtom(atom)

where: GetAtomName takes a handle and returns a string; AddAtom takes a string, adds it to the pool of data structures, and returns a handle which is placed in a CMI entry; and Delete Atom takes a handle and deletes the string from the pool of data structures.

Figure 10B:
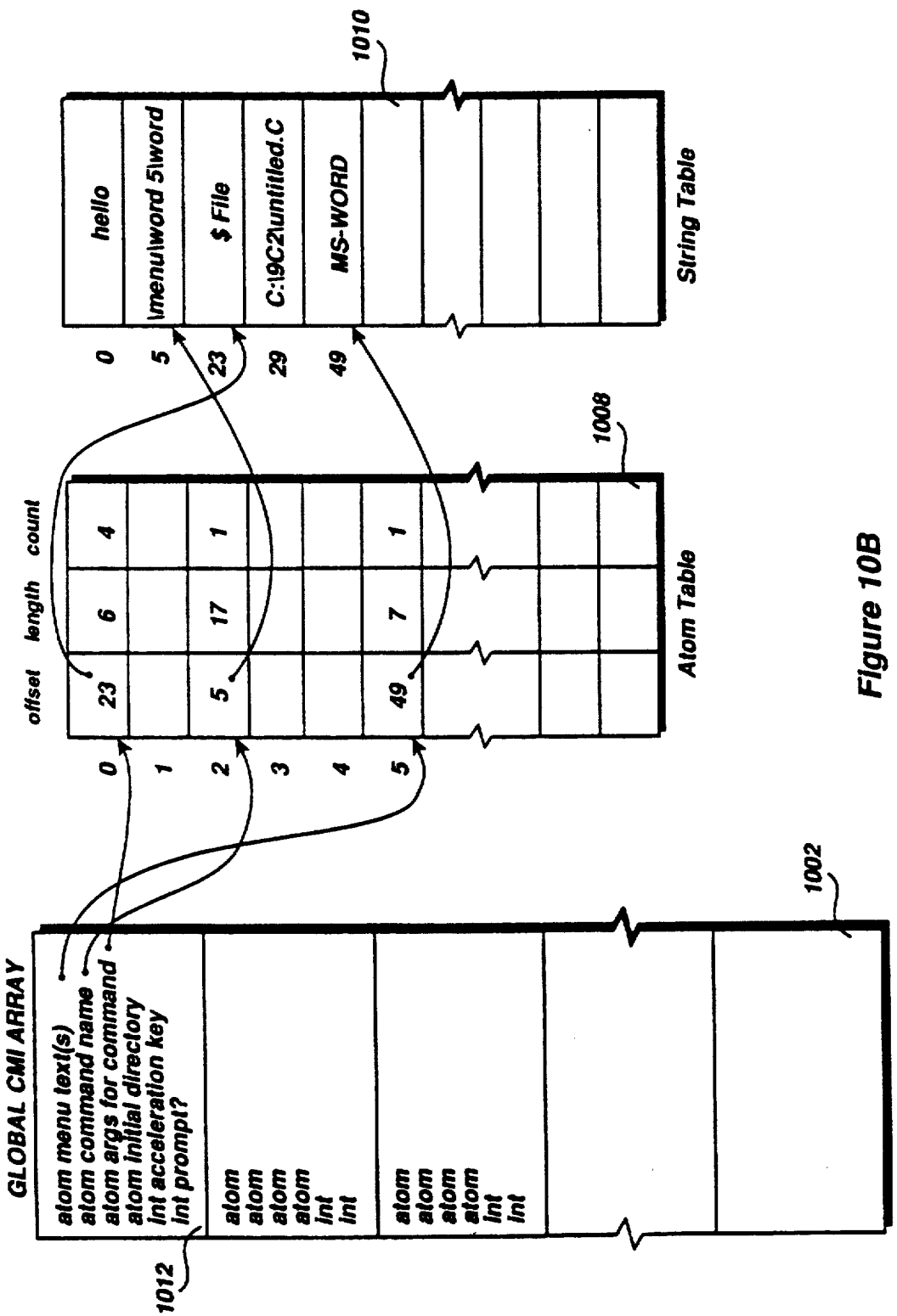
FIG. 10B is a more detailed diagram of the Custom Menu item array used in accordance with the principles of the present invention.

Referring now to FIG. 10B, as noted above, each CMI array entry contains a plurality of atoms which correspond to menu item characteristics, and a plurality of integer values which indicate user selected options. For example, in the preferred practice of the present invention, each CMI array entry includes an atom for menu text, command name, command arguments and execution directory. In addition, integer fields are provided which indicate a desired accelerator key as well as whether a user desires a prompt on return. Each atom comprises a handle which points to a location in table 1008. Each location in atom table 1008 contains an offset value, a length value and a count value. The present invention provides a mechanism whereby text strings are defined only once and are stored in a string table. Whenever an atom refers to a text string, its offset value is set to point to the specific location in the string table. Therefore, multiple atoms may refer to the same location in the string table, thus providing an efficient memory usage mechanism. The offset value in the atom table is used to define the position of a string relative to the beginning of the string table. The len (length) value is used to define the length of a particular string. The count value is used to record the number of times a particular string is referenced wherein cnt is incremented whenever another atom refers to a particular string, and decremented whenever an atom is deleted.

Thus, for the example explained in conjunction with FIGS. 1-9, one possible instance for atom table 1008 and string table 1010 may be explained as follows. A CMI table entry 1012 is generated based on inputs generated by the user through dialog box 121. The menu text atom may point to the 6th entry in atom table 1008, wherein an offset of 49 points to the "MS-WORD" text string which is 7 characters long. A count value of 1 indicates this text string is only referenced once. Similarly, the command name atom may point to the third entry in atom table 1008, wherein an offset of 5 points to the "\menu\word5\word" text string which is 17 characters long. This text string is located at offset 5 because the first string in the string table is 5 characters long. The command argument atom may point to the first entry in the atom table which points to the "$File" string which is located at offset 23 and which is 5 characters long. In this example, this atom table entry is referenced by four different atoms. Therefore, unique atoms and text strings are defined only once and an indexing system is employed to reference the atoms to the proper table locations. Executing a particular menu command merely requires accessing the appropriate CMI array entry and accessing the proper table entries based on the values of the relevant atoms.

As will be further discussed below, the temporary array 1004 is created whenever the customization feature of the present invention is invoked to store a copy of the CMI array 1002 prior to any modifications. If the user selects the "Cancel" option displayed in the dialog box, the array 1004 is copied over the array 1002 to restore the original contents of array 1002.

Figure 11:
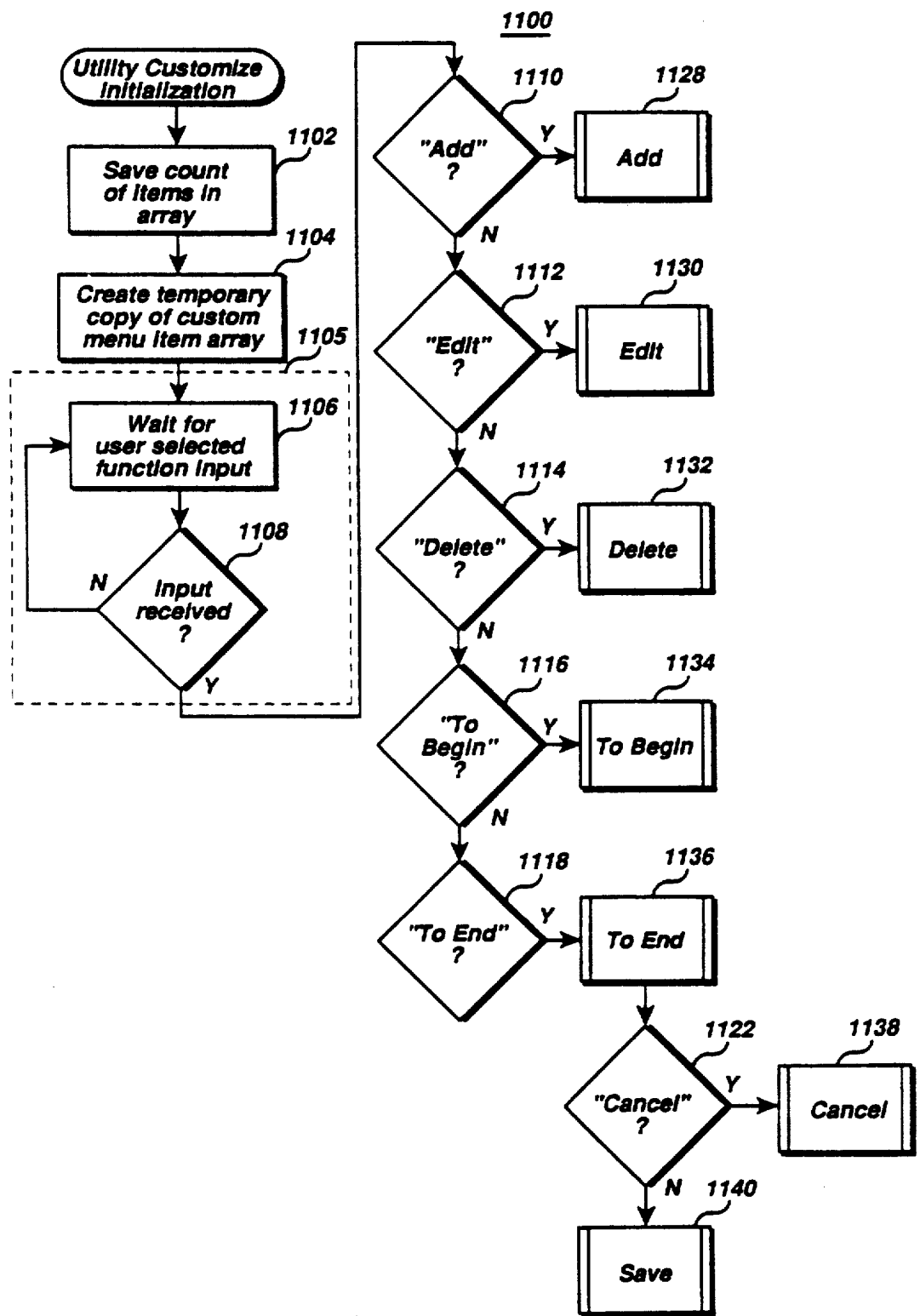
FIG. 11 is a flow diagram of the initialization routine invoked whenever the customization feature of the present invention is invoked.

Referring now to FIG. 11, the routine 1100 is invoked whenever the "Customize Menu . . . " menu command is invoked. Once invoked, item 1102 determines the number of menu items in the CMI array and saves the determined number as the variable "count". Item 1104 then creates the temporary CMI array 1004, described above. Loop 1105, formed by item 1106 and decision 1108 is then entered to wait for input from a user. Once user input is received, decisions 1110–1122 test the user input for the option selected by the user, wherein the routine 1100 invokes the utility corresponding to the selected option upon detection of the user input. For example, if the "Add" option is selected, decision 1110 routes program control to "Add" utility 1128; if the "Edit" option is selected, decision 1112 routes program control to "Edit" utility 1130; if the "Delete" option is selected, decision 1114 routes program control to "Delete" utility 1132; if the "To Begin" option is selected, decision 1116 routes program control to "To Begin" utility 1134; if the "To End" option is selected, decision 1118 routes program control to "To End" utility 1136; if the "Cancel" option is selected, decision 1122 routes program control to "Cancel" utility 1138; and if the "Save" option is selected, decision 1122 routes program control to "Save" utility 1140.

Figure 12:
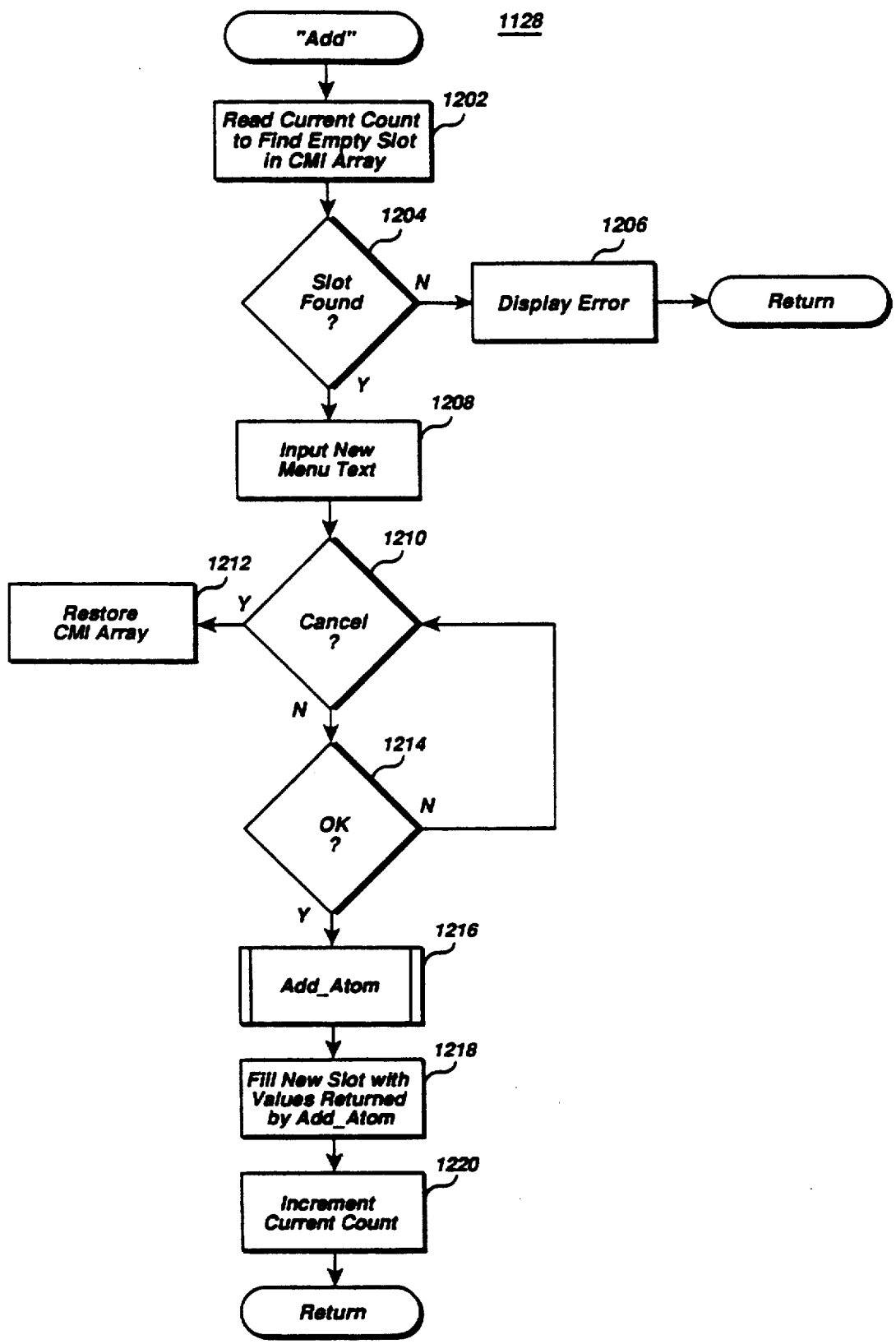
FIG. 12 is a flow diagram of the "Add" utility invoked by the initialization routine of FIG. 11.

FIG. 12 is a flow diagram of the "Add" utility 1128 which is invoked by the routine 1100 to create a new entry in the CMI array 1002. When invoked, item 1202 reads the value of a "Current_Count" variable to determine the size of the CMI array and whether a CMI array location or slot is available. Decision 1204 then determines whether a slot is available. If not, item 1206 displays and error and the routine returns to item 1106. If a slot is available, item 1208 inputs the new menu text, the program or utility to run, an accelerator key combination, etc. Typically, information entered by the user is either a text string such as "MS-WORD" for menu text or "c:\word5\word" to specify a program to run. Other fields entered by the user are integers such as "3" for accelerator key combination (Alt+F3). Decision 1210 then determines whether the user selects the "Cancel" or "OK" options. If the user selects "Cancel", the CMI array is restored in item 1212 (control passes to item 1106 to wait for further user input (Add, Edit, etc). If the user selects "OK", control passes to the Add_Atom routine 1216 which generates atoms for the information input by the user (i.e. menu text, command arguments, starting directory, etc.). When the Add_Atom routine 1216 returns, item 1218 updates the CMI array with the values returned by Add_Atom. Item 1220 then increments the "Current Count" variable to reflect the presence of a new menu item and returns to item 1106.

Figure 13:
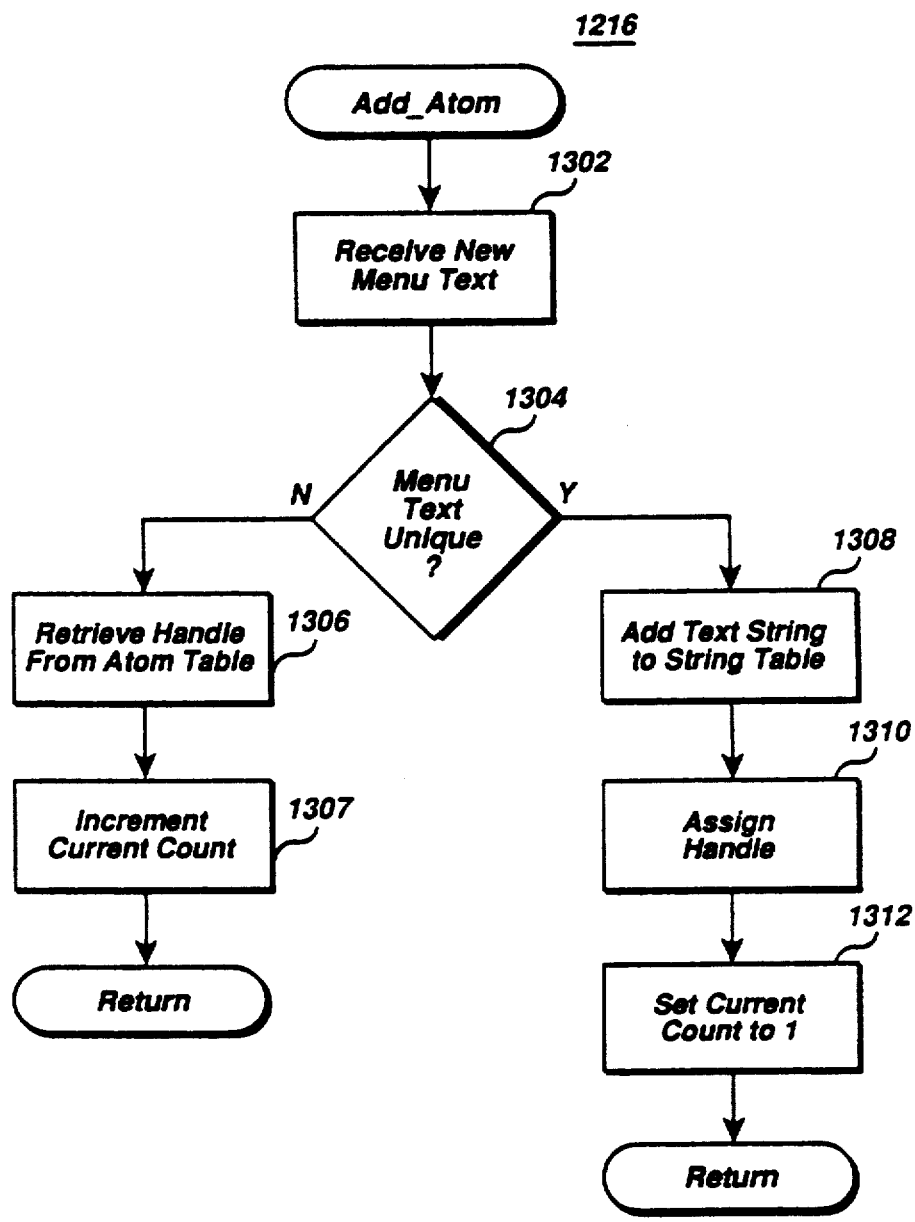
FIG. 13 is a flow diagram of the "Add_Atom" utility invoked by the "Add" utility of FIG. 12.

FIG. 13 is a flow diagram of the Add_Atom routine 1216 invoked by the Add routine 1128. When invoked, item 1302 receives the text string input by the user. Decision 1304 then determines whether the text string is unique. If not, item 1306 retrieves the corresponding handle from the "Atom Table" 1008. Item 1307 then increments the count and the routine returns. If the text string is unique, item 1308 adds the text string to the string table 1010 and item 1310 assigns a handle to the text string. Item 1312 then sets the count equal to 1, and routine to item 1106 then returns.

Figures 14, 15A:
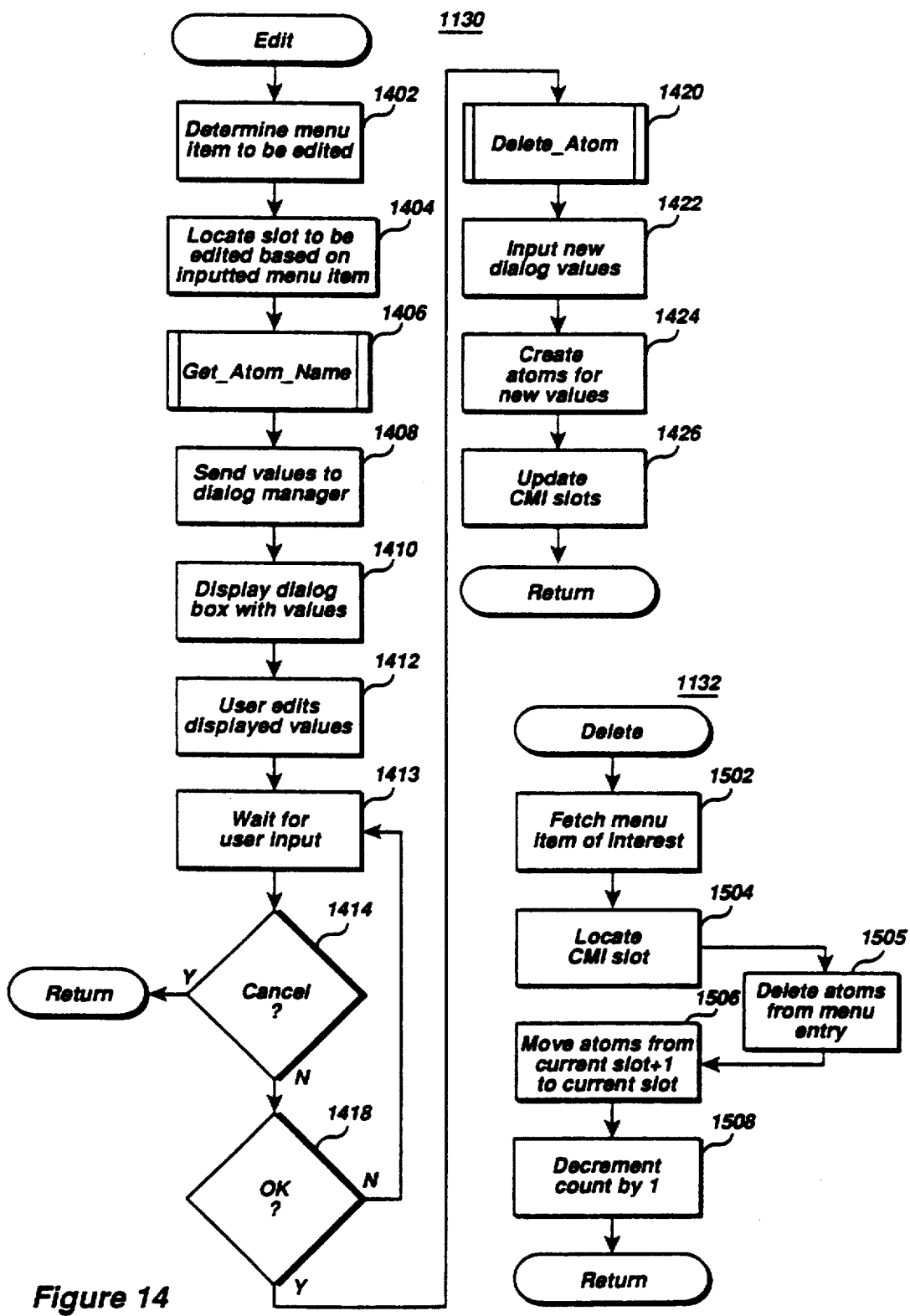
FIG. 14 is a flow diagram of the "Edit" utility invoked by the initialization routine of FIG. 11.
FIG. 15A is a flow diagram of the "Delete" utility invoked by the initialization routine of FIG. 11.

Referring now to FIG. 14, the "Edit" routine 1130 is shown. When invoked, item 1402 determines the menu item to be edited. Item 1404 then locates the slot in the CMI array based on the designated menu item. The current edit dialog box field values (text strings) are then retrieved by the Get_Atom_Name routine 1406 wherein the values returned by Get_Atom_Name are sent to the dialog manager by item 1408. The present invention may be used with any of a number of dialog managing techniques and no specific dialog manager is preferred over others. The dialog manager then displays the edit dialog box with the retrieved values in item 1410. Next, a user edits the displayed values, in item 1412. Once the values are edited, the method waits for user input and decisions 1414, 1418 determine whether the user selects the "Cancel" or "OK" options. If the "Cancel" option is selected, the routine 1130 returns to item 1106. If the "OK" option is selected, control passes to the delete atom routine 1420 to delete any old strings (menu text, command arguments and starting directory) which were edited by the user. When Delete_Atom returns, control returns to item 1422 which obtains new values from the dialog manager. Item 1424 then creates atoms for the newly inputted or changed dialog field values. Item 1426 then updates the CMI slots with the newly created atoms and the routine returns.

Referring now to FIG. 15A, the delete routine comprises process 1132, which removes menu items from the CMI array. When invoked, item 1502 fetches the name of the menu item of interest. Item 150 locates the CMI slot corresponding to the designated atom. Item 1505 then deletes the atoms for menu text, program name, arguments, and initial directory. Item 1506 then block copies atoms in the current slot+1 into the current slot as shown in FIG. 15B. For example, if prior to deletion the, CMI array structure contained slot1, slot2, slotD, slot3, slot4, after the execution of item 1506, the CMI array structure would contain slot1, slot2, slot3, slot4. Item 1508 then decrements the value of the count variable by 1.

Figure 16:
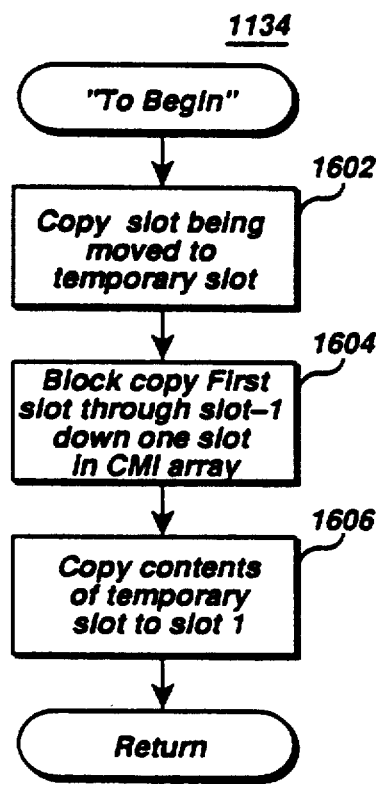
FIG. 16 is a flow diagram of the "To Begin" utility invoked by the initialization routine of FIG. 11.

Referring now to FIG. 16, the "To Begin" routine 1134 is invoked when a user selects the "To Begin" input in dialog box 118. The "To Begin" and "To End" options are used to reorganize the order in which menu items appear in dialog box 118. The "To Begin" routine 1134 is invoked to move a selected menu item to the beginning of the list of menu items. When invoked, item 1602 copies the data structure corresponding to the menu item of interest into a temporary slot. Item 1604 copies all data structures in the CMI array above the emptied slot down one slot to free a CMI slot at the beginning of the CMI array. The contents of the temporary slot are then copied to the first slot in the CMI array by item 1606.

Figure 17:
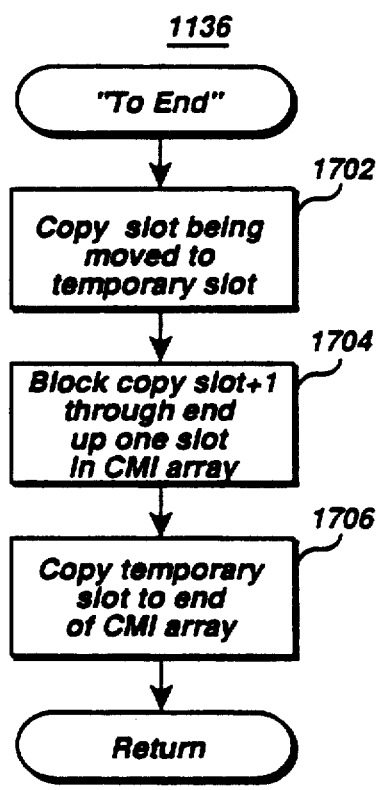
FIG. 17 is a flow diagram of "To End" utility invoked by the initialization routine of FIG. 11.

Referring now to FIG. 17, the "To End" routine 1136 is invoked to move a selected menu item to the end of the list of menu items. When invoked, item 1702 copies the data structure corresponding to the menu item of interest into a temporary slot. Item 1704 copies all data structures in the CMI array below the emptied slot up one slot, to free a CMI slot at the end of the CMI array. The contents of the temporary slot are then copied to the last slot in the CMI array by item 1706.

Figure 18:
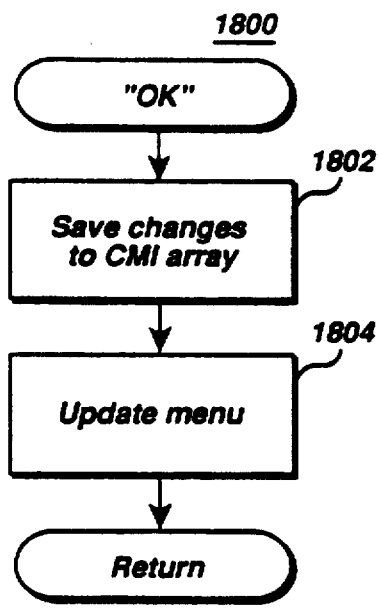
FIG. 18 is a flow diagram of the operations performed when a user selects the "OK" option in a displayed dialog box.
Figure 19:
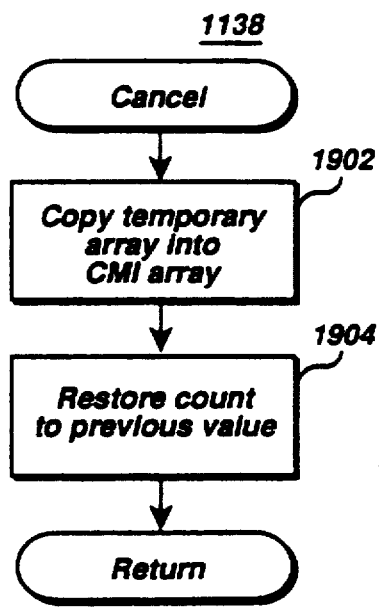
FIG. 19 is a flow diagram of the operations performed when a user selects the "Cancel" option in a displayed dialog box.

Referring now to FIGS. 18 and 19, once a user has entered desired information in the various text or integer fields in the dialog boxes of the present invention a user typically selects the "OK" or "Cancel" options. If the "OK" option is selected, item 1802 saves the changes to the CMI array and item 1804 updates the user definable menu 114. If the user selects the "Cancel" option, item 1902 copies the temporary array 1004 over the CMI array 1002 and item 1904 restores the count variable to the previous value.

Figures 20, 21:
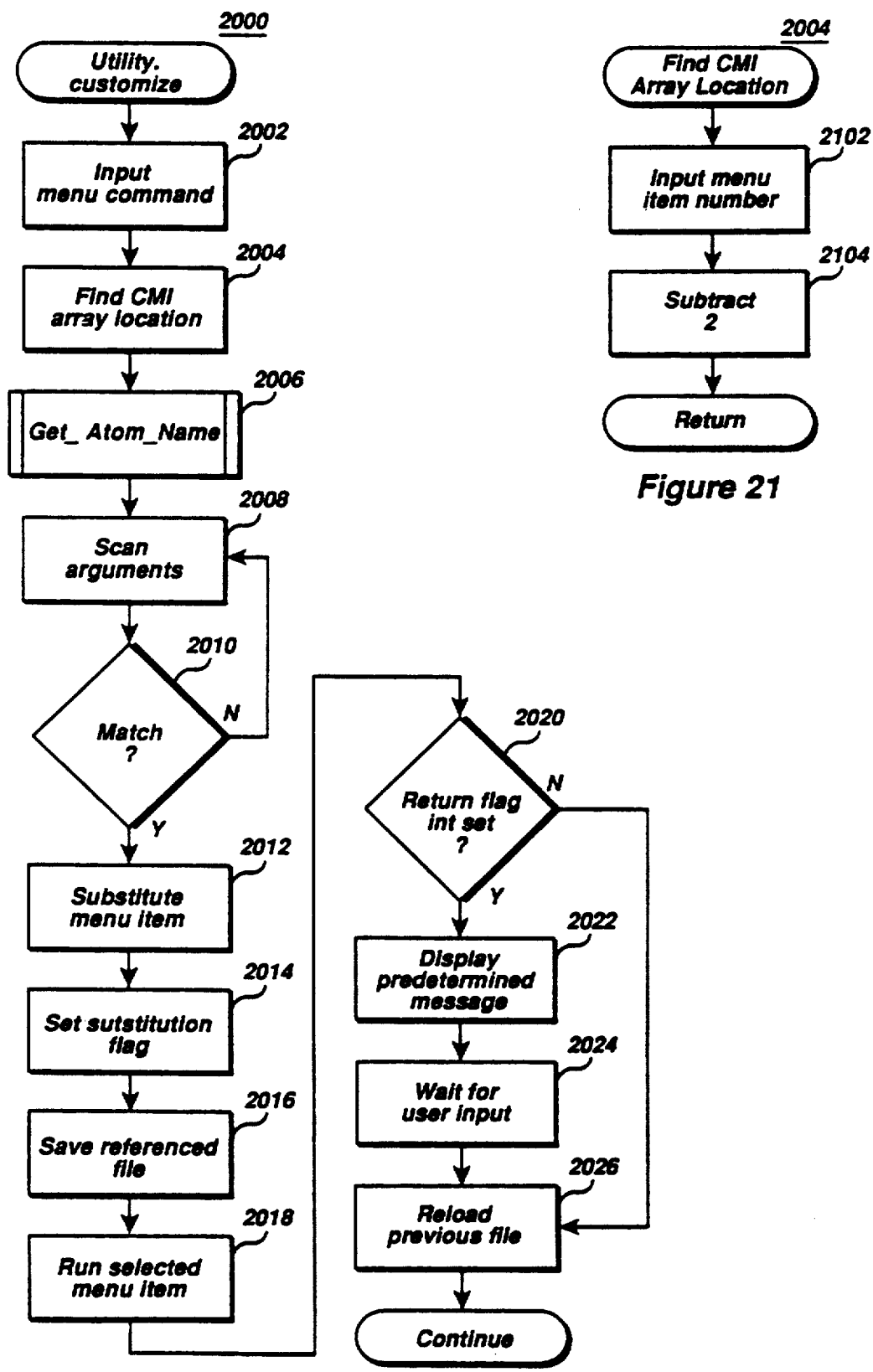
FIG. 20 is a flow diagram of the operations performed whenever a user selects a menu item in the user definable menu area.
FIG. 21 is a flow diagram of the Fine_CMI_Array_Location routine invoked by the routine of FIG. 20.

Referring now to FIG. 20, the routine 2000 is invoked whenever a user selects a menu command in the user defined menu 114. When invoked, item 2002 polls the new menu manager to determine which menu command is selected by the user. Item 2004 is then invoked to find the CMI location which corresponds to the user selected menu item. Once the CMI array location is found, the Get_Atom_Name routine is invoked to extract menu text, program path information, integer information for the selected menu item. Items 2008 and 2010 then expand the retrieved information by scanning the respective argument information to determine which file is currently active in the user display area and to complete the command line argument corresponding to the currently active file. Item 2012 then substitutes the reconstructed command line argument for the selected menu item. Item 2014 sets the substitution flag if there was a reference to $File in the argument string to indicate the argument has been reconstructed and the referenced file is saved in item 2016 if the substitution flag is set. Item 2018 then executes the selected menu item based on the reconstructed argument. Decision 2020 then determines whether the return flag int is set. If so, item 2022 displays a predetermined message such as "Hit any key to continue". Item 2024 waits for user input to respond to the displayed message. Once received, if $File was referenced, item 2026 reloads the previous file and the routine 2004 continues.

Referring now to FIG. 21, the Find_CMI_Array_Location routine begins with item 2102 which inputs the menu item number. Since the CMI array is parallel with the user defined menu, the routine 2004 simply subtracts two from the menu item location to compensate for the fixed menu items in the menu 110. This action is performed in the 2104. The routine 2004 then returns.

Figure 22:
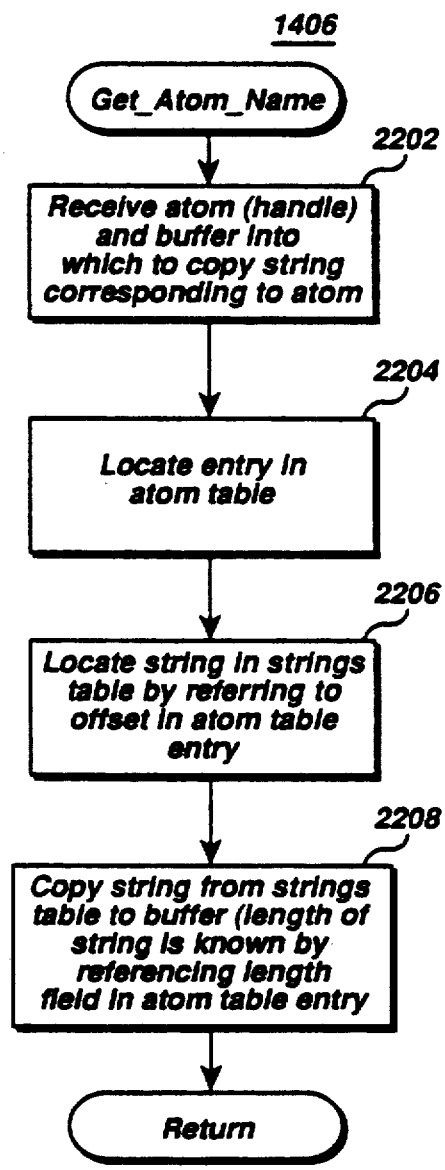
FIG. 22 is a flow diagram of the Get_Atom_Name routine invoked by the routine of FIG. 14.

Referring now to FIG. 22, the Get_Atom_Name routine is invoked to map an atom to a corresponding string. When invoked, item 2202 retrieves the number of an atom of interest passed to the routine. Item 2204 then uses the atom number to index into the atom, take and locate the atom of interest. Item 2206 then locates the string in the string table based on the offset in the atom table entry. Item 2208 copies the string from the string table into a buffer and the routine returns.

Figure 23:
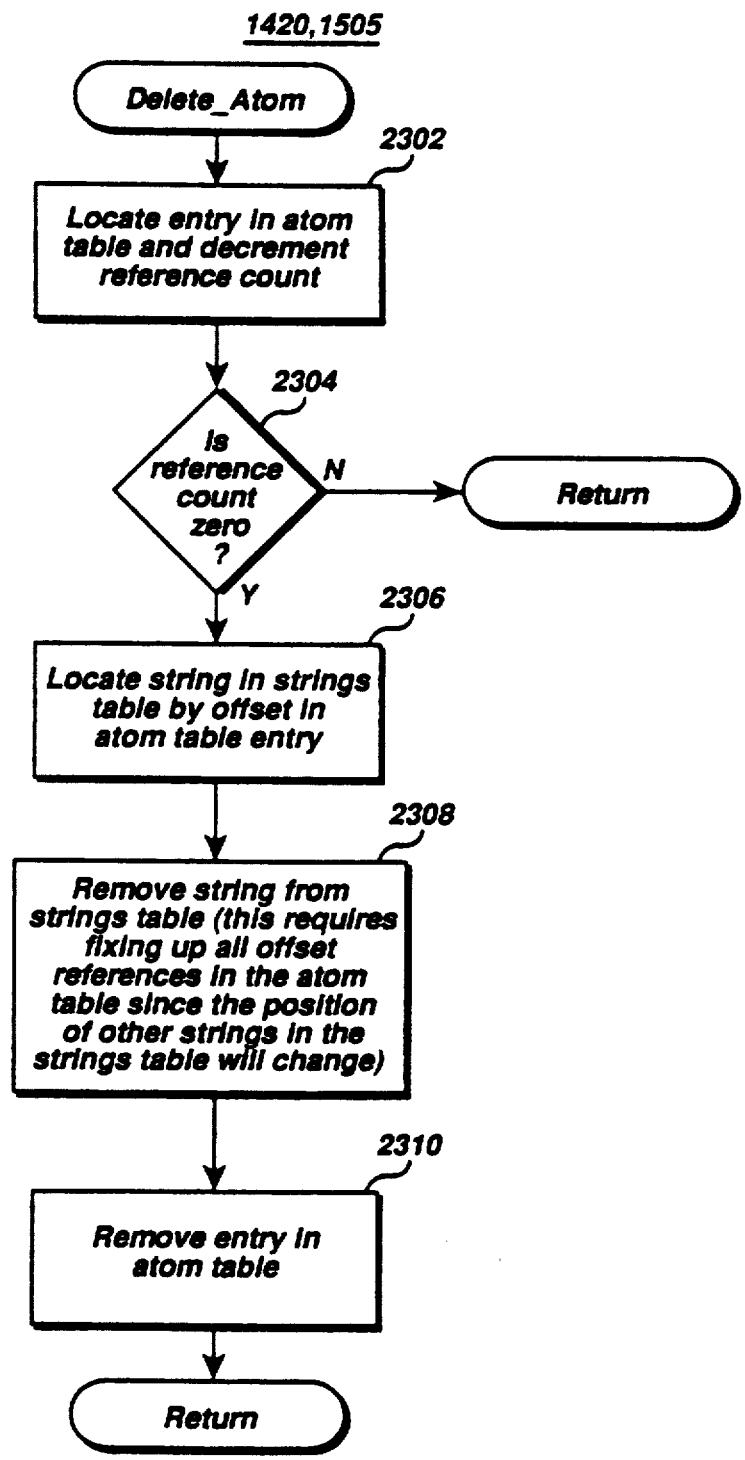
FIG. 23 is a flow diagram of the Delete_Atom routine invoked by the routine of FIG. 14.

Referring to FIG. 23, the Delete_Atom routine is used to delete atoms which are no longer needed. When invoked, item 2302 locates an atom of interest in the atom table and decrements the reference count. Decision 2304 then determines whether the reference count has been decremented to zero if the routine returns. Otherwise, item 2306 locates the string in the string table based on the offset in the atom table entry. Item 2308 then removes the string from the string table and reformats the offset references in the atom table to compensate for the deleted text string. The corresponding entry in the atom table is then deleted by item 2310 and the routine returns.

In summary, an improved method and system for implementing a customized user interface in an integrated environment has been described. In accordance with the principles of the present invention, user customizable menus are provided in which virtually any program which may be executed on a computer may be invoked from within a predetermined environment wherein arguments may be passed from the predetermined environment to the external program. In accordance with the principles of the present invention program descriptors and arguments may be defined in the table of generic fields which are linked with specific menu entries through an indexing system comprising pointers and tables. A system is provided whereby external programs may be invoked by merely referring a generic table entry which provides the information necessary to provide a complete description of a desired function. Accordingly, other uses and modifications will be apparent to persons of ordinary skills in the art and all such uses are intended to fall within the scope of the appended claims.

We claim:

1. A computer system for allowing a user to customize a user interface of a first computer program for invoking a second computer program, the system comprising:

means for displaying a menu with menu items that are available for selection by the user of the first computer program;

means for storing an identification of the second computer program;

means for adding a new menu item to the menu;

handle means for linking the new menu item to the identification of the second computer program; and means for selecting the new menu item, including means for saving a source file before executing the second computer program, and means for executing the second computer program on the source file.

2. The system of claim 1, further comprising means for saving the source file after the second program has finished executing.

3. A method executed in a computer for customizing a user interface for a first computer program, the first computer program having a menu for displaying menu items, each menu item having an associated function, the computer having a memory, the method comprising the steps of:

inputting data from a user of the first computer program wherein the data relates to a second computer program and wherein the data includes text strings;

storing each text string in the memory of the computer;

generating a handle for each stored text string wherein each handle contains a reference to the text string stored in memory;

generating a menu item entry associated with the second computer program wherein the menu item entry contains a plurality of generated handles;

storing the menu item entry in the computer memory;

associating the menu item entry with the menu;

displaying the menu associated with the menu item entry wherein the generated handles in the stored menu item entry are retrieved and wherein the text strings are retrieved from the memory through the retrieved handles; and selecting the menu item entry based on an indication by the user, including saving a source file before invoking the second computer program, and invoking the second computer program, to execute on the source file, based on a text string stored in the memory that is referenced by the handle in the menu item entry.

4. The method of claim 3, further including the step of saving the source file after the second program has finished executing.

* * * * *